United States Patent
Cordy, Jr.

(10) Patent No.: US 7,108,225 B2
(45) Date of Patent: Sep. 19, 2006

(54) MORE AERODYNAMIC WHEEL FAIRINGS FOR SMALL AIRPLANES

(76) Inventor: Clifford Bernard Cordy, Jr., 6402 Mae Anne #20, Reno, NV (US) 89523

( * ) Notice: Subject to any disclaimer, the term of this patent is extended or adjusted under 35 U.S.C. 154(b) by 0 days.

(21) Appl. No.: 10/385,360

(22) Filed: Mar. 11, 2003

(65) Prior Publication Data

US 2005/0211830 A1    Sep. 29, 2005

(51) Int. Cl.
*B64C 25/02*    (2006.01)
*B64C 7/00*     (2006.01)

(52) U.S. Cl. .................................. 244/103 R; 244/130
(58) Field of Classification Search ............ 244/103 R, 244/130, 102 R, 129.4, 129.5
See application file for complete search history.

(56) References Cited

U.S. PATENT DOCUMENTS

| | | | | |
|---|---|---|---|---|
| 2,346,010 A | * | 4/1944 | Cowey | ..................... 244/100 R |
| 2,457,625 A | * | 12/1948 | Amiot | ..................... 244/129.5 |
| 2,538,389 A | * | 1/1951 | Smith | ..................... 244/103 W |
| 2,921,501 A | * | 1/1960 | Parot | ........................... 89/1.51 |
| 3,750,986 A | * | 8/1973 | Bede | ..................... 244/103 R |
| 6,352,221 B1 | * | 3/2002 | Sakurai | .................. 244/102 R |

* cited by examiner

*Primary Examiner*—Galen Barefoot
(74) *Attorney, Agent, or Firm*—Seed IP Law Group PLLC

(57) ABSTRACT

The invention described here provides better aerodynamics in airplane wheel fairings. A great improvement is achieved by putting doors on the fairing that completely enclose the wheel. This eliminates drag from the part of the tire that extends outside of a normal wheel fairing. It also eliminates drag from the turbulence associated with the gap between the wheel and the lower edge of a normal fairing. The described wheel fairing is very close to the size and shape of an ideal fairing that could totally enclose an isolated wheel assembly, but would not allow the airplane to land. In fairings where the gear leg enters the top of the fairing, drag is reduced by having a sharp ridge on the top of the fairing, rather than the rounded fairing that is presently used. A further reduction in total drag on the wheel fairing (at least in airplanes traveling around 100 m/s or more) is achieved by making the length to width ratio of the fairing in the range of 3.5.

19 Claims, 7 Drawing Sheets

MORE AERODYNAMIC WHEEL FAIRINGS FOR SMALL AIRPLANES

BACKGROUND OF THE INVENTION

Wheel fairings can be designed to have very low aerodynamic drag. However, on the ground at least, a wheel fairing must allow the tire to protrude from the fairing. In the air, this is a significant part of the drag of the entire airplane. Builders of racing airplanes go to great effort to minimize the amount of tire extending below the wheel fairing and to minimize the gap between the edge of the fairing and the surface of the tire. The result is a wheel fairing that is damaged (or destroyed) by roughness or discontinuities in runways or taxiways, or by gravel becoming wedged between the tire and the opening in the fairing. Such problems are acceptable in a race plane for the sake of gaining a bit of speed. Such problems are not acceptable in a general purpose airplane. A considerable improvement over the best wheel fairings flying today could be achieved by adding a door, or doors, that close in flight to completely enclose the wheel assembly. This has not been done, probably because it is so difficult to devise a practical implementation of such a fairing.

In most small airplanes, the landing gear is mounted on legs extending outward and downward from low on the fuselage. These gear legs are connected to the inboard end of the axle. The wheel fairings are mounted to the gear legs. Conventional wisdom is that such wheel fairings should have a cross section that is roughly oval shaped for most of the length of the fairing, which should end in a vertical knife-edge at the rear. On low wing airplanes with the gear legs attached to the wings, the gear leg could end in a fork (like that holding the front wheel of a bicycle), which gives much better strength to weight ratio than a cantilevered axle attachment. Existing wheel fairings for such airplanes still have the same general shape as that just described. This is not optimum. An optimum fairing has a ridge on the top extending from the gear leg to the aft end of the wheel fairing.

Aerodynamic drag can be divided into two general categories, pressure drag and friction drag. There is an optimum length for a fairing intended to minimize the total drag on a body moving thru the air. At low speeds (Reynolds number below about 100,000), the optimum ratio of the length of the fairing to its maximum width is about 5:1. If the fairing is made shorter, pressure drag will increase faster than the surface friction is reduced. Conversely, if the fairing is made longer, friction drag increases faster than pressure drag is reduced. The situation changes at high speed (Reynolds numbers above about 1 million). Turbulence at these speeds significantly increases friction drag relative to pressure drag, and optimum fairings are shorter, Wheel fairings on modem, high-performance airplanes flying 100 m/s and faster, are operating at Reynolds numbers of 5 to 10 million. These will have turbulent air flow over much of the wheel fairing, certainly on the bottom, and most likely everywhere aft of the widest part of the fairing. Drag in turbulent flow is very complicated and there is no general solution for the optimum length to width ratio. Since friction drag increases relative to pressure drag, wheel fairings should have a length to width ratio well under 5:1 and in some cases it should approach 3:1. Apparently designers of wheel fairings have taken the published number of optimum L/W=5 without recognizing that the wheel fairings are far above the Reynolds number where that L/W ratio is applicable. Even wheel fairings on airplanes of 60 or 70 years ago were operating at Reynolds numbers of a few million, so this has been wrong from the start. The shortest wheel fairings presently available are manufactured by Klaus Savier, Santa Paula, Calif. His fairings have a length to width ratio of 4:1. Wheel fairings on high performance airplanes would have less total drag if they were shorter than this.

A cursory look at the wheel fairings on formula 1 planes at the Reno Air Races, for example, shows that most fairings are still shaped for laminar flow. Careful measurements reveal that the shortest fairings have a length to width ratio of 4.0 and L/W ratios of 5 and more are common. Discussions with pilots, crew chiefs, and designers reveals an attitude that the fairing should look good (or look like the plane over there that goes fast). It seems that no one has considered the increased drag caused by turbulence over the wheel fairings on planes traveling at the speeds presently being achieved.

BRIEF SUMMARY OF THE INVENTION

The drag on the wheel assembly of an airplane is greatly increased by the part of the tire extending outside the fairing and by the turbulence caused in and near the gap between the tire and the fairing. In this innovation, drag on the wheels is minimized by completely enclosing them within wheel fairings with doors that close when in flight. The doors may be actuated mechanically (thru some linkage) electrically (with a motor or solenoid), or aerodynamically (using pressure or energy from the passing air).

In an airplane with the landing gear leg entering the wheel fairing at the top, the optimum shape of the wheel fairing does not have an oval cross section behind the attachment point of the gear leg. The lowest drag shape has a sharp ridge along the top of the wheel fairing behind the gear leg attachment. In any horizontal cross section above the axle, the shape of the fairing closely approximates an ideal fairing for a cylinder of a diameter equal to the maximum width of the fairing at that level.

At the speeds that high performance airplanes are now achieving, traditional wheel fairings are not the optimum shape. Lower total drag can be achieved by making the fairings considerably shorter.

Design procedures are presented that produce a wheel fairing with doors that close in flight, having an optimum shape with a ridge on the top aft part of the fairing, and being an optimum length.

BRIEF DESCRIPTION OF THE DRAWINGS

FIG. 1 also provides a side view of the doors that close over the wheel in flight.

There is no case of an identifying number being used for two different things in two different figures. Also, any one item has the same identifying number in every figure in which it appears. For instance, item 1 is the fixed wheel fairing in every figure.

Figure 1:
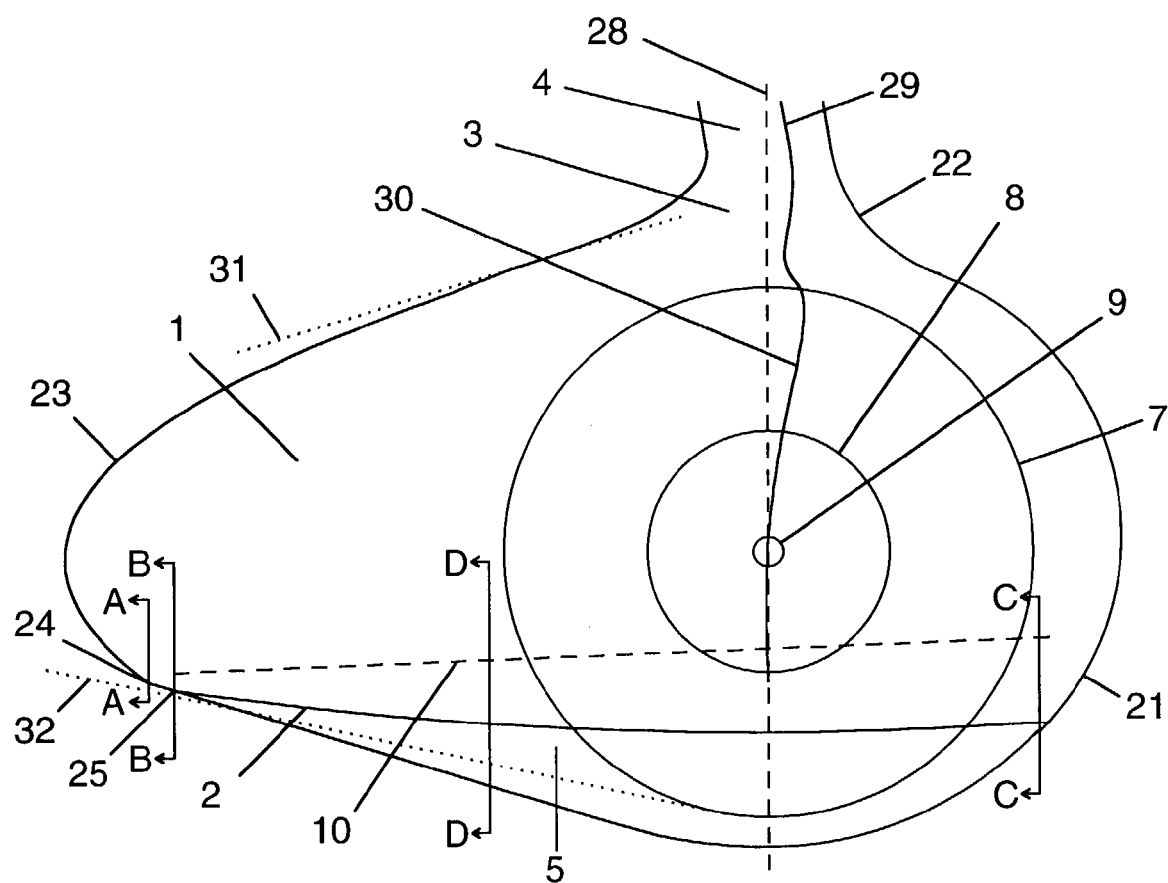
FIG. 1 is a side view of a wheel fairing showing the ridge continuing from the gear leg fairing to the knife edge at the rear of the wheel fairing.

These are precise mechanical drawings. The sectional views (FIGS. 2–7) are twice as large as the side view (FIG. 1).

DETAILED DESCRIPTION OF THE INVENTION

Wheel Fairing that Completely Encloses the Wheel

In a small airplane with well-designed wheel fairings, much of the total drag associated with the wheel assembly is caused by the part of the tire extending outside the fairing and by the turbulence caused in and near the gap between the tire and the fairing. That aerodynamic drag can be eliminated entirely by attaching a door (or set of doors) to the wheel fairing, said doors being closable while the plane is in the air. It is possible to design a single door that can be closed in flight to completely enclose the wheel. Such a design is impractical. It is not possible to design a single door enclosure in which the door opens within the fixed fairing unless the fixed fairing is outrageously large. A door that opens outside the fixed fairing produces huge drag when it is open. This would have significant effect on takeoff, on final approach, and if the doors failed to close in flight. Also, the open door looks like crap on the ground. Most people who look at an airplane in any detail, do so on the ground. "Looks like crap" is not the goal of the person who has just spent his life savings on a new toy.

Designing a system of three or more doors is needlessly complex. The remainder of this discussion deals with a fixed fairing that surrounds the bulk of the tire and wheel and a pair of doors that can be closed in flight to completely enclose the wheel assembly in a very aerodynamic fairing, said doors being contained completely within the fixed fairing when open. This produces a fairing that is very decent, by today's standards, even when the doors are open. It also looks good.

It is possible to design such a pair of doors that pivot around axes that are either approximately parallel to the direction the airplane is traveling or approximately parallel to the axle of the wheel. There is no need for the two axes to be coincident, level, or even parallel. The simplest implementation of this innovation uses a cord or cable to pull the doors open, while letting springs, gravity, and/or air flow pull them closed. Other possible implementations include: two cords or cables that open and close the doors; a rigid linkage that both opens and closes the doors with either rotational or linear motion of the linkage; motors that operate the doors; or air flow or air pressure to close the doors above some given speed. With the doors closed, the wheel fairing can be the optimum shape for enclosing the entire wheel and tire, with lower drag than anything in the air today.

A. FIG. 1 shows a side view of a wheel fairing with doors that close in flight. In this view, the doors are closed. Also shown in FIG. 1 are the locations of several sections, shown in FIGS. 2, 3, 4, 5, and 6. FIG. 1 will be discussed in more detail later.

Figure 2:
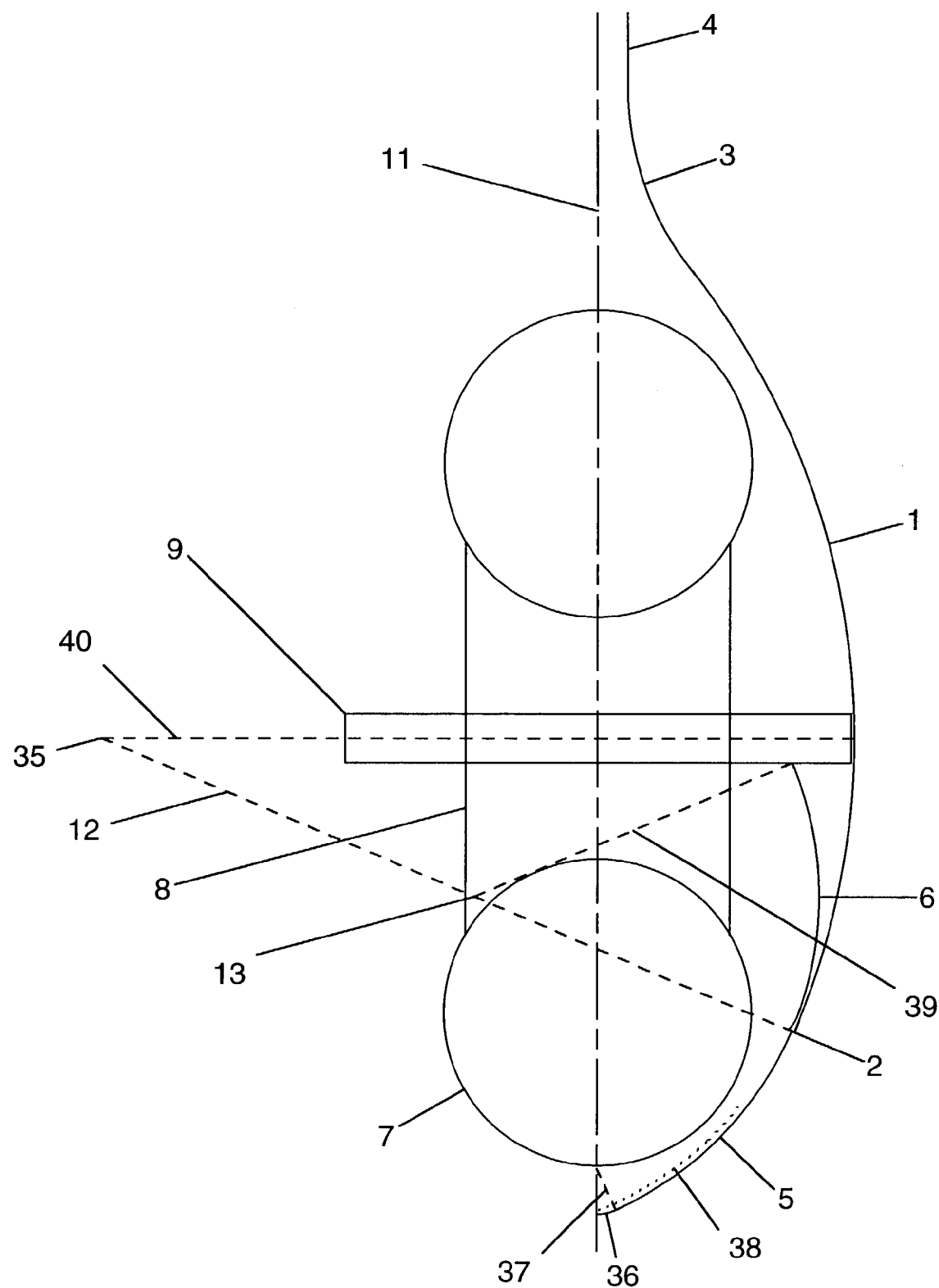
FIG. 2 is a section containing the axle of a wheel fairing seen from the front, showing the bottom of the gear leg, the intersection fairing, and doors that close in flight to completely enclose the wheel assembly.

FIG. 2 is a front view of a cross section thru the widest part of the fairing of FIG. 1. This is the most useful view for describing the design and operation of the fairing and doors. This is just one of many possible implementations of a wheel fairing with doors that close. For the sake of clarity, FIG. 2 shows one half of the fairing. The other half of the fairing is symmetrical around the center line (11). This is the most critical place in the design because of the requirements: (A) the open doors cannot interfere with the axle or its mounting hardware, (B) the doors should be completely within the fixed wheel fairing when open, and (C) the surface area of the fairing should be minimized, hence (D) the width of the wheel fairing should be minimized. The implementation shown in FIG. 2 has doors that rotate around separate axes which are nearly parallel to the direction of travel of the airplane. This particular implementation has two significant advantages. First, the surface area of the fairing is very little larger than the minimum required to completely surround the wheel assembly in an ideal fairing, thus being very close to the theoretical minimum drag. Second, the doors are entirely below the axle of the wheel when they are open, which makes it mechanically simple. Third, the bottom (2) of fixed fairing (1) and the tops of movable doors (5) is a smooth curve (in FIG. 1) which makes the molds simple and the doors easy to manufacture. FIG. 2 shows the gear leg entering the wheel fairing at the top of the fairing. The operation of the doors is identical if the gear leg enters the wheel fairing at the side with a cantilevered axle. Both mounting arrangements are common. Since there is no functional difference in the design and operation of the doors, no drawing is included of the cantilever style of attachment between axle (9) and the gear leg.

Still referring to FIG. 2, fixed wheel fairing (1) is mounted to, or is an extension of, gear leg (4). Intersection fairing (3) minimizes drag at the intersection between gear leg (4) and wheel fairing (1). Wheel fairing (1) encloses the tire (7), wheel (8), axle (9), and brake (not shown) with enough clearance from all rotating parts to allow for some lateral movement and irregularities in tire (7). Fixed wheel fairing (1) extends down to a lower edge (2) that is high enough to give comfortable ground clearance. Line (12) is constructed perpendicular to lower edge (2) of fixed fairing (1). Two doors completely enclose the lower part of tire (7) when they are closed (5). Most of the surface of these doors is a constant radius of curvature (39) (for clarity shown only on the door in its open position (6)), that is no larger than the radius of curvature (12) of fixed fairing (1) at its lower edge (2). The surface area of the entire wheel fairing is minimized if the center of curvature of the doors (13) is also the center of rotation around which the doors open and if the center of rotation lies on line (12). The center of curvature (35) near the lower edge (2) of fixed fairing (1) may lie on the centerline (40) of axle (9), as shown, but this is not necessary. This allows doors (5) to be opened with no interference with fixed fairing (1).

In order to avoid having an edge (bad aerodynamics) at the joint between closed doors (5), a much shorter radius of curvature (37), is used near the joint. As door (5) opens, the lower edge follows a path (38) that gives adequate clearance from the lower part of tire (7). Door (5) is shown in its stowed position (6), totally inside fixed wheel fairing (1), clear of axle (9), and well clear of tire (7), providing space for the tire to bulge on a hard landing. In the implementation shown, the angle of rotation of the door between the closed (5) position and the open (6) position is about 45.8°. It is not necessary that the cross section of the sides of fixed fairing (1) be a circular arc. Using a circular arc does produce a fairing that is very close to the minimum possible drag, and it is esthetically pleasing to the eye of the observer.

Note: There is a maximum of one cross section where the wheel fairing can be assigned an arbitrary shape, as has been done here in FIG. 2. At all other cross sections, the shape is a result of minimizing air drag.

Returning to FIG. 1, it becomes apparent that if the lower edge (2) at the wide point of fixed fairing (1) were extended back horizontally, there would not be enough clearance over the runway to allow the plane to rotate sufficiently at takeoff. To get adequate clearance, the lower edge (2) of fixed fairing (1) must follow a curve. The lower edge (2) of fixed fairing (1) may follow a similar or different curve (26) ahead of axle (9) to gain more clearance over obstacles (like rocks) and discontinuities in the runway. As drawn in FIG. 1, wheel fairing (1) will not drag on a smooth runway when the airplane has a nose up attitude of 12°, as shown by dotted line (32), which is tangent to tire (7) and has a 12° slope. 12° is considerably more rotation than is recommended for takeoff and is generally impossible to achieve when landing with flaps extended.

In addition, FIG. 1 shows the axes of rotation (10) for the wheel fairing doors (5). The axes (10) need not be either horizontal or parallel. They may be more widely spaced at the rear and closer together at the front. The axes of rotation (10) do not need an equivalent to a hinge pin passing the length of the axis. Thus, the axes of rotation (10) can pass thru tire (7), wheel (8), and/or brake (not shown). They may also lie outside wheel fairing (1) near the ends of doors (5). This is discussed further below.

Figure 3:
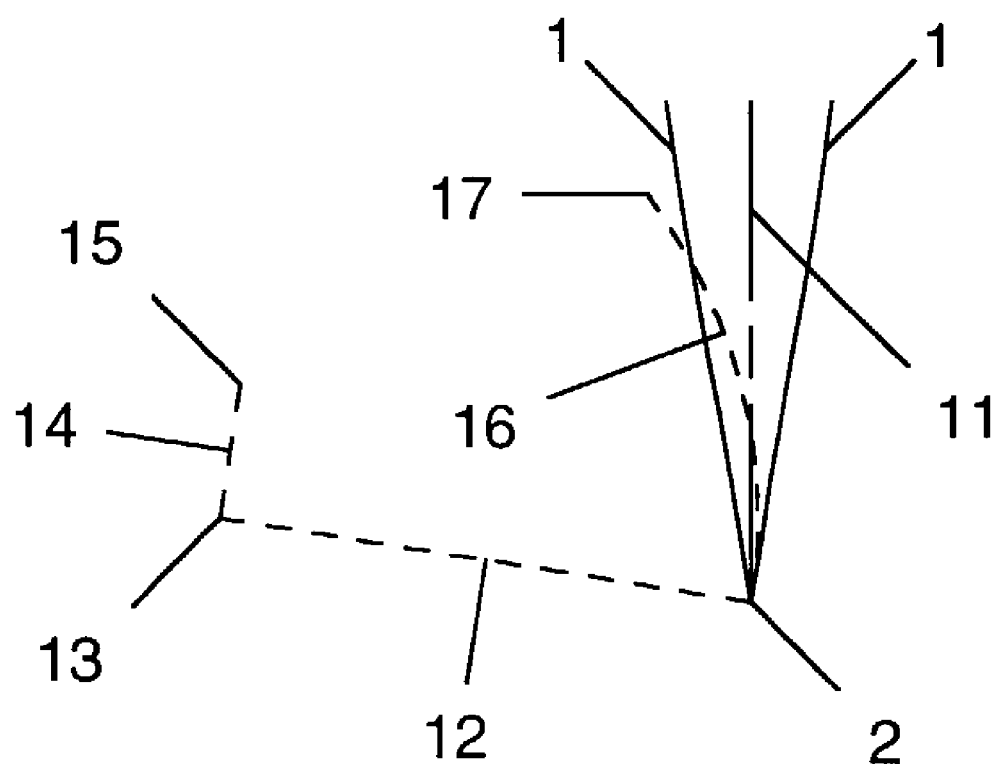
FIG. 3 is a section containing the aft end of the wheel fairing, seen from the front, showing the bottom part of a wheel fairing, demonstrating that a door cannot work in that position.

While the shape of the fairing and doors is most critical at the cross section containing axle (9), the design of the rest of the fairing is not trivial. FIG. 3 is section A—A in FIG. 1, taken at the bottom of the knife edge (24) at the rear of fixed wheel fairing (1). FIG. 3 shows both sides of the lower part of wheel fairing (1), symmetrical around center line (11). A line (12) is constructed perpendicular to the right surface of fairing (1) at its bottom edge (2). Any possible center of rotation (13) for a fairing door in this section must lie on or below line (12). If the axis of rotation where the fairing is widest (FIG. 2, item 13) were extended parallel to the axis of the airplane to section A—A, it would pass thru point (15). The shortest distance from point (15) to line (12) is line (14), which passes thru line (12) at point (13), forming a perpendicular to line (12). An arc (16), 45.8° long, centered on point (13), and beginning at point (2), ends at point (17). Point (17) lies outside the volume of wheel fairing (1). Other radii of curvature can be tested. In no case will the end (17) of arc (16) lie within fairing (1). Hence, it is impossible to extend the wheel fairing doors back to the bottom of the knife edge at the rear of fixed fairing (1).

Figure 4:
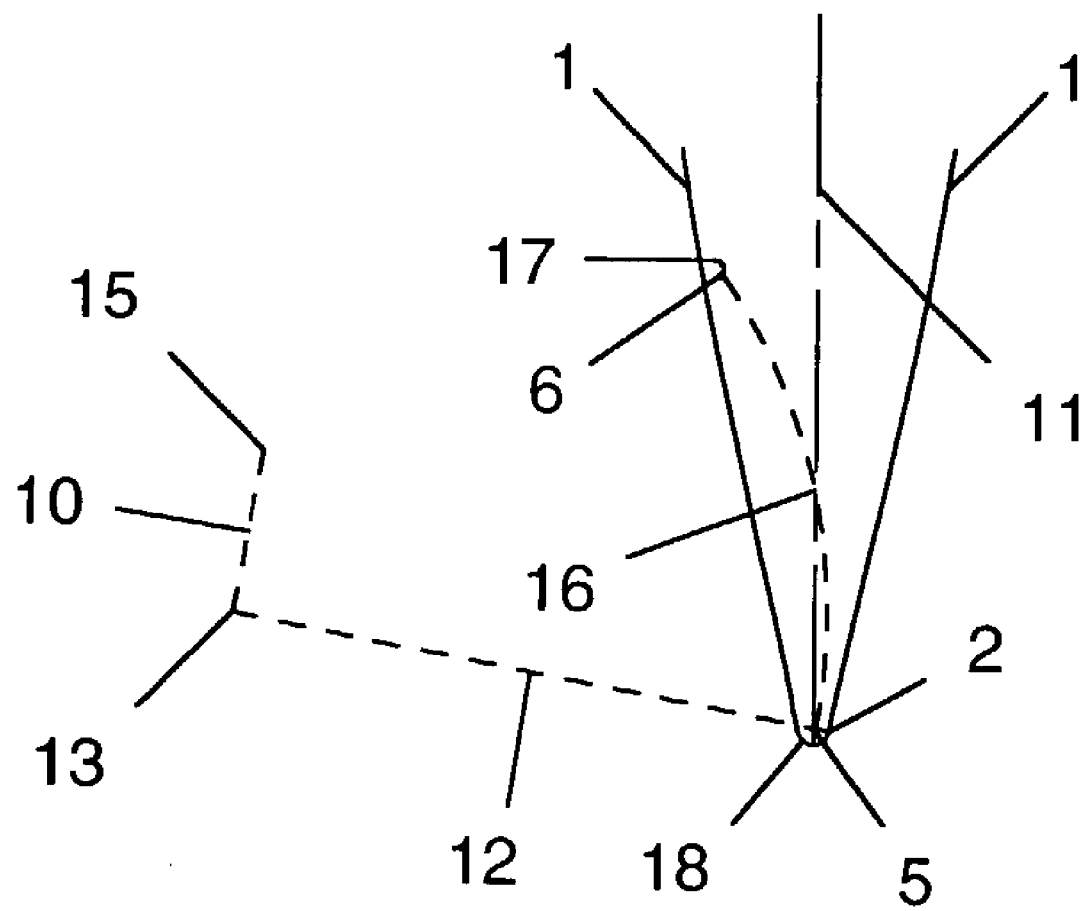
FIG. 4 is a section containing the back end of the doors, seen from the front, showing the bottom part of a wheel fairing and the aft end of the door in its open and closed position.

Now move forward a few mm to section B—B in FIG. 1 and follow the same construction procedure. This is shown in FIG. 4. The lower part of wheel fairing (1) is symmetrical around center line (11). At this aft position, the bottom (18) of fairing (1) is rounded with a short radius. A line (12) is constructed perpendicular to the right surface of fairing (1) at point (2), the top of rounded bottom (18), also the bottom of the relatively flat side of fairing (1). Any possible center of rotation (13) for a fairing door in this position must lie on or below line (12). If the center of rotation where the fairing is widest (FIG. 2, item 13) were extended parallel to the axis of the airplane to this section, it would pass thru point (15). The shortest distance from point (15) to line (12) is line (10), which passes thru line (12) at point (13). An arc (16), 45.8° long, centered on point (13), and beginning at point (14), ends at point (17). Point (17) lies inside the volume of wheel fairing (1), leaving room for a reasonable wall thickness of fairing (1). At the bottom (18) of fairing (1), there is room for the point of a closed door (5). This point can move thru the 45.8° arc (16) to location (6) and remain within the walls of fairing (1). Thus, it is possible to make the closable doors extend back to the location of section B—B. In this case, the aft tip of the open door (6), is located at the same point as the upper end (17) of the 45.8° arc (16).

If there are two symmetrical doors at section B—B, each door would cross center line (11) while opening, and it would be impossible to open both doors. There is no need for the doors to be symmetrical. Much of the aft opening of fixed fairing (1) can be covered by only one door, which is much longer than the shorter door. Then, at section B—B, there is only one door and it can cross center line (11) without interference.

Now there are two points defined on the axis of rotation of doors (5), point (13) in FIG. 2, the widest part of fairing (1), and point (13) in FIG. 4, the furthest aft location where a door (5) can be opened. Two points define a line. Hence, the axis of rotation (10) is defined. It remains to be proved that this axis is acceptable for all locations along the length of door (5).

Figure 5:
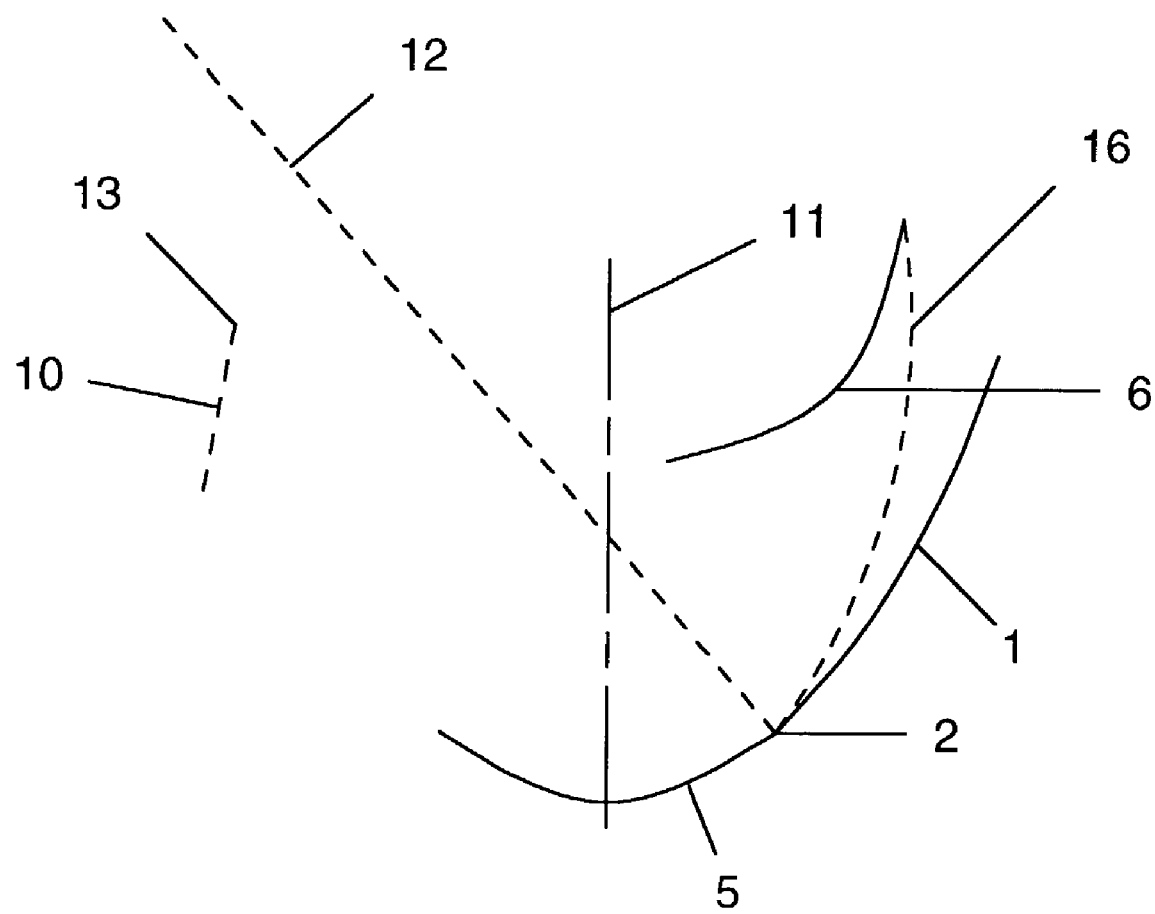
FIG. 5 is a section containing the front end of the doors, seen from the front, showing the bottom part of a wheel fairing and the door in its open and closed position.

With potential axes of rotation defined by the centers of rotation at the middle and rear of fixed fairing (1), the most likely place for a conflict is at the front. FIG. 5 is a front view of the lower part of the front of the fairing at section C—C of FIG. 1. For the sake of clarity, only one side of fixed fairing (1) is shown. Fixed fairing (1) is symmetrical around center line (11). Line (12) is perpendicular to lower edge (2) of fixed fairing (1). Axis of rotation (10) is extended forward to point (13) where axis (10) intersects the plane of section C—C. Point (13) is the center of rotation of closed door (5). The top of door (5) swings to its open position (6) along a 45.8° arc (16). As long as point (13) is below line (12), and is not a great distance outside fixed fairing (1), door (5) will open without interference with fixed fairing (1). This requirement is met with abundant room to spare.

As is obvious from FIG. 5, it is possible to extend the asymmetry of doors (5) to the front of the fairing. There is no advantage in doing so. There is a potential disadvantage. If the doors are not perfectly made and installed, the joint between them will not be perfect. Such imperfections will cause less drag if the air is flowing parallel to the joint than if it is flowing across the joint.

Figure 6:
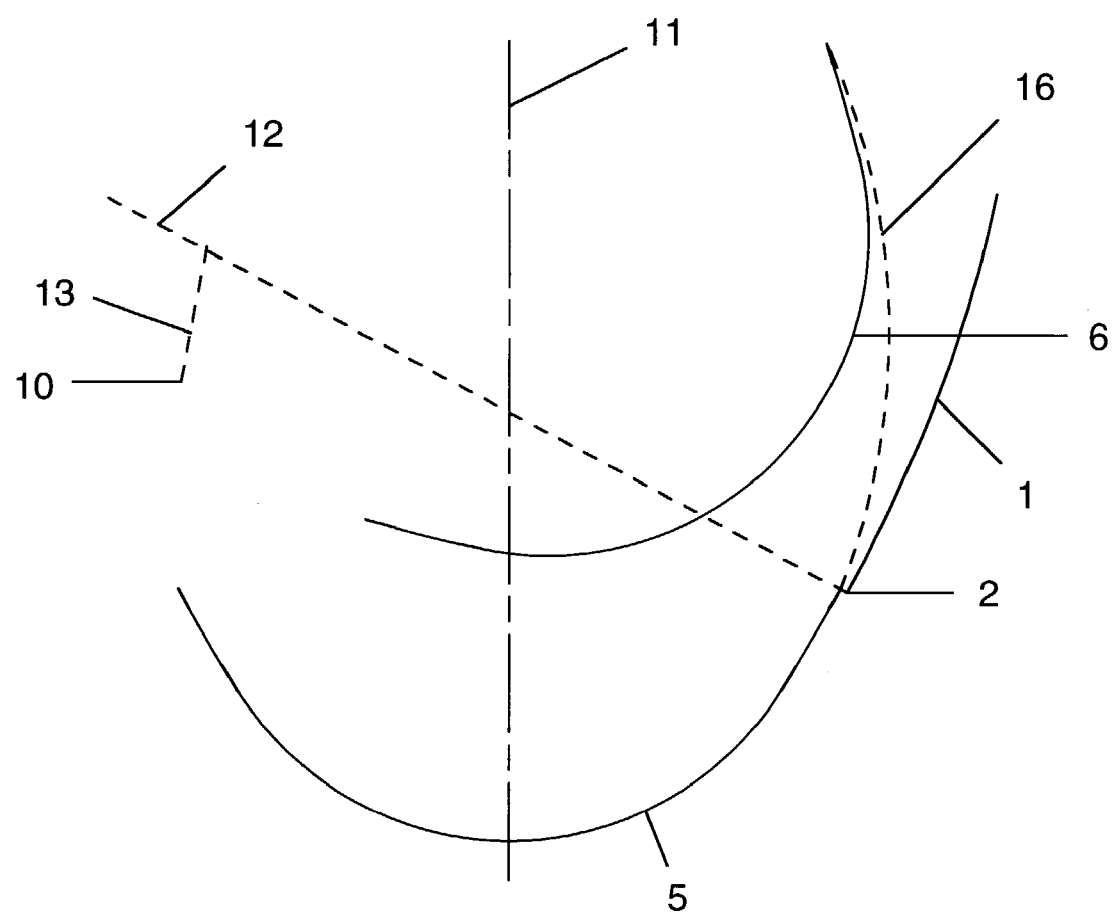
FIG. 6 is a section located somewhat behind the wheel, seen from the front, showing the bottom part of a wheel fairing and the door in its open and closed position.

The only remaining question is: How far forward from the rear tip can the doors remain significantly asymmetrical? FIG. 6 shows a front view of the lower part of the fairing at section D—D of FIG. 1. This lies just behind the most aft part of the tire. Line (12) is constructed perpendicular to the surface of fixed fairing (1) at its lower edge (2). Fixed fairing (1) is symmetrical around its center line (11). Axis of rotation (10) intersects section D—D at point 13. This defines the center of rotation of the door as it swings from its closed position (5) to its open position (6). As long as point (13) lies below line (12), door (5) can open without interference from fixed fairing (1). This requirement is satisfied with considerable room to spare. The upper edge of door (5) opens 45.8° along arc (16) to its open position (6). Door (6) is entirely within fixed fairing (1) when open, even when the closed door (5) covers the entire opening of fixed fairing (1), as shown in FIG. 6.

In actuality, the smaller door does not even need to extend as far back as tire (7) does. There is no advantage to making the smaller door its minimum possible length, and the mechanical mounting of the pivot points for the doors is easier if they are located behind the tire.

Demonstrating that the fairing doors can be opened at the front, widest point, a point slightly aft of the tire, and at the rear does not constitute a mathematical proof that they will open at all points along their length. It is a strong indication that the scheme will work. From an engineering point of view, construction of a working wheel fairing is adequate proof.

There is nothing magic about swinging the doors 45.8° to open them completely. In the geometry presented here, that happens to be the optimum opening. That angle will vary with several fixed parameters, most importantly the ratio of the tire diameter to the thickness of the tire/wheel/brake assembly.

As a safety feature, the fairing doors can be made very thin. If a landing is made without opening the doors (for any reason), the doors will easily tear away with no further damage to the structure, and with no significant effect on the landing.

This innovation, a wheel fairing that completely encloses the wheel by closing a pair of doors over it, significantly reduces the drag on the wheel assembly. It is applicable to any airplane with non retractable landing gear.

Design Summary for Doors that open

There is a logical sequence of steps that produces a very low drag wheel fairing with a minimum of effort. Once the problem of designing a wheel fairing with doors is solved correctly for a specific wheel assembly, and the general procedure is developed to solve this class of problems, the design becomes easy. Solving the initial problem, and generalizing that process to apply to any wheel, is the result of two years of work, and the result is clearly unique. Nobody else has doors on their wheel fairings. Just figuring out the proper shape for the fixed part of the fairing, and developing a general design process, took a year, and resulted in a considerable improvement to the shape of wheel fairings, with or without doors.

The design process is: (A) Design a cross section, as in FIG. 2, that comfortably encloses the wheel assembly. This fixes one pair of points on the axes of rotation of the doors and determines the maximum width of the fairing at any height. (B) The widest point on the fairing will lie on the center line of the axle. (C) Above and below the axle, the widest points of the fairing at that height need not be directly above or below the axle. (D) The leading edge of the fairing at the level of the axle should be ahead of the axle about 1.2 times the thickness of the fairing at the axle. (E) From that point, draw an aerodynamic, esthetically pleasing, shape for the leading edge, as in FIG. 1. (F) Draw the trailing edge. The trailing edge is behind the leading edge by a distance of about 3.5 times the thickness of the fairing at that level. (G) Determine how far back the doors must extend to give adequate nose-up attitude for the airplane. (H) Determine where the center of rotation must be in order to open the doors at the rear of the door. That fixes the second pair of points that define the axes of rotation. (I) Design the remainder of the doors, making sure that they have a shape that allows them to open and close without interference with the tire, wheel, axle, fixed fairing, or each other. (J) For best aerodynamics, the doors (in cross section) should have zero slope on the center line of the fairing (no ridge where they close together) and the same slope as the lower edge of the fixed fairing at the lower edge of the fixed fairing (again, no ridge).

Optimum Length of Wheel Fairings

On fast airplanes, a significant reduction in total drag can be achieved by using a wheel fairing that is considerably shorter than existing wheel fairings. The long fairings presently in use are longer than needed to enclose the tire assembly. Thus, that is not the limiting factor in the wheel fairing design. The fairing shown in FIG. 1 has a length of fixed fairing (1) that is only 3.3 times its greatest width. Still, it encloses the wheel assembly comfortably, despite having a length slightly less than twice the diameter of tire (7).

An additional benefit derived from the short wheel fairing is that the shape of the lower aft part of the fairing can be made closer to an ideal shape. The long fairings presently in service must be swept up behind the wheel faster than desired in order to provide clearance over the runway when the plane rotates for takeoff.

Optimum Shape of Wheel Fairing with Gear Leg Entering the Top

Present wheel fairings have a roughly oval cross section for most of the length of the fairing with a vertical knife edge at the aft end. The reasoning is as follows: The optimum fairing for an isolated sphere has circular cross sections at all positions. The optimum fairing for an infinite vertical cylinder has an ideal "fairing shape" at any horizontal cross section. A tire and wheel is like two halves of a sphere separated by a short cylinder. It makes sense that the optimum fairing would be similar to two halves of a fairing for a sphere separated by a section of a fairing for a cylinder. Indeed, the best wheel fairings presently flying do approximate that shape, with some additional rounding near the nose of the fairing.

The minimum drag fairing designed for high speed has a maximum slope behind the faired object of about 0.30. Considering the aft part of the fairing, the top and bottom of an optimum fairing for an isolated wheel would have a slope (seen from the side) in the range of 0.30 and the sides (seen from the top) would also have a slope of about 0.30. Since most airplane tires are much higher than they are wide, the slopes of the top and bottom would intersect well behind the intersection of the slopes of the sides. The result is that the slopes of the top and bottom of the fairing should be about 0.30 until they reach the sharp rear edge formed by intersections of the slopes of the flow lines passing around the sides of the tire. Ideal fairings for a sphere or cylinder have a pressure recovery configuration near the rear end. Indeed, a fairing conforming FIGS. 2–6 does have that shape.

The wheel is not an isolated object. It is mounted to a gear leg that must be strong, hence have a significant thickness. If the gear leg enters the wheel fairing near one end of the axle, the oval cross section presently used is truly the best shape for the wheel fairing. If the gear leg enters the wheel fairing from the top, roughly centered on the wheel, a different shape will produce lower drag. FIG. 1 is a side view of the wheel fairing and gear leg. It shows a wheel fairing (1) with doors (5) that close over the tire (7) and wheel (8). The doors have no bearing on the shape of the top of the fairing. The gear leg (4) enters wheel fairing (1) at the top. The axis (29) of gear leg (4) is not necessarily vertical nor does it need to pass thru axle (9). Gear leg (4) is much narrower than wheel fairing (1). In order to prevent a large intersection drag at the joint between wheel fairing (1) and gear leg (4), there must be an intersection fairing (3) between the two. A front view of intersection fairing (3) is shown in FIG. 2, item (3). For good aerodynamics, gear leg (4) and intersection fairing (3) must be faired in horizontal planes for minimum drag. At any given height, these fairings will approximate the shape a fairing for an infinite cylinder of the diameter that needs to be faired at that height. The transition (3) between gear leg (4) and fixed fairing (1) is so smooth and gradual that intersection drag is effectively eliminated.

The easiest way to design an efficient wheel fairing shape is to select an aerodynamic shape for the leading edge of the fairing that is high enough to enclose the tire, merge this shape smoothly to the leading edge of the gear leg, select a width of the fairing that is wide enough to enclose the tire, locate the axle at the widest part of the wheel fairing (about ⅓ of the way back), and optimize the rest of the shape of the wheel fairing around these constraints. At any given height, the locus of the widest points of the resulting fairing will not necessarily lie in the vertical plane containing the axle. The axis of the gear leg need not pass thru the axle and, in general, it is undesirable for it to do so.

Based on the above design guide, FIG. 1 shows the leading edge (21) of fairing (1) merging smoothly (22) with gear leg (4) in the region of intersection fairing (3). At any level, there is a desired width of wheel fairing (1) and intersection fairing (3), further discussed below. There is a corresponding length of the ideal fairing for that width (about 3.5 times the width). Plotting those lengths for each height behind the curve for the leading edge (21 and 22) yields a curve (23) for the trailing edge of wheel fairing (1). Also, plotting the locus of the widest points of wheel fairing (1), intersection fairing (3), and gear leg (4) ⅓ of the distance from the leading edge (21 and 22) to the trailing edge (23) produces a curve (30) that may have considerable bending and irregular shape. This is not an aerodynamic problem. It may be a practical problem to producing a mold of that shape. The irregular nature of curve (30) can be eliminated entirely by drawing a smooth curve for the locus of widest points that lies near an "average" position of curve (30) and forcing the airfoil curves to conform. This will have negligible aerodynamic effect. On a highly polished wheel fairing, it will also produce a reflection that does not appear to wobble badly (esthetically desirable).

The dotted line (31) in FIG. 1 shows a slope of 0.30, the maximum desired slope for the top of an oval wheel fairing behind the axle. Notice that at all points, the slope of the top of curve (23) exceeds 0.30. This is true even when gear leg (4) enters wheel fairing (1) well ahead of axle (9), as shown, and when gear leg (4) is sloped so its axis passes even further ahead of axle (9), as shown. The slope of the top (23) of wheel fairing (1) is even greater if gear leg (4) is further back relative to axle (9) or is more vertical.

One result of this analysis is that when the gear leg (4) enters the top of wheel fairing (1), the top (23) of wheel fairing (1) should not be rounded behind gear leg (4). In order to make it round would require even steeper slopes than shown in FIG. 1, which would cause considerably more drag than the sharp ridge that results from maintaining the "fairing shape" of horizontal sections at all levels above axle (8).

The long wheel fairings presently in use have slopes much less than 0.3. Thus it might appear that the top of a long fairing aft of the gear leg should be oval shaped, as present fairings are. This is not true. Long fairings designed for use at low speeds have maximum slopes of 0.2 or less. The taper from the knife edge back of the faired gear leg and intersection fairing to the knife edge of the back of the wheel fairing will exceed the slope anywhere else in the fairing. An oval top can be incorporated in the fairing only if the trailing edge of the fairing is raised and the total surface area is increased. This causes more drag. The lowest drag wheel fairings with the gear leg intersecting at the top will have a ridge down the top of the aft part of the fairing independent of the other criteria that were used in the design.

This innovation, a further improvement to the aerodynamics of wheel fairings by making a ridge on the upper aft section of the wheel fairing, is applicable to any airplane with non retractable gear in which the gear leg attaches to the axle from above the wheel.

Gear Legs

The most common configuration for gear legs on small airplanes is for the gear legs to emanate from the lower part of the fuselage, aimed outward and downward to the axle, and have a cantilever connection to the axle. In this configuration, the wheel fairings described above, with doors that close, and a length/width ratio of about 3.5 are applicable. The optimum cross section of the fairing is an oval shape.

A second common configuration is for the gear leg to emanate from the under side of the wing, aimed more-or-less straight down, and have a fork that connects to both ends of the axle. In this configuration, all aspects of the wheel fairings described above are applicable; doors that close, a length/width ratio of about 3.5, and a ridge on the top of the fairing aft of the gear leg.

Figure 7:
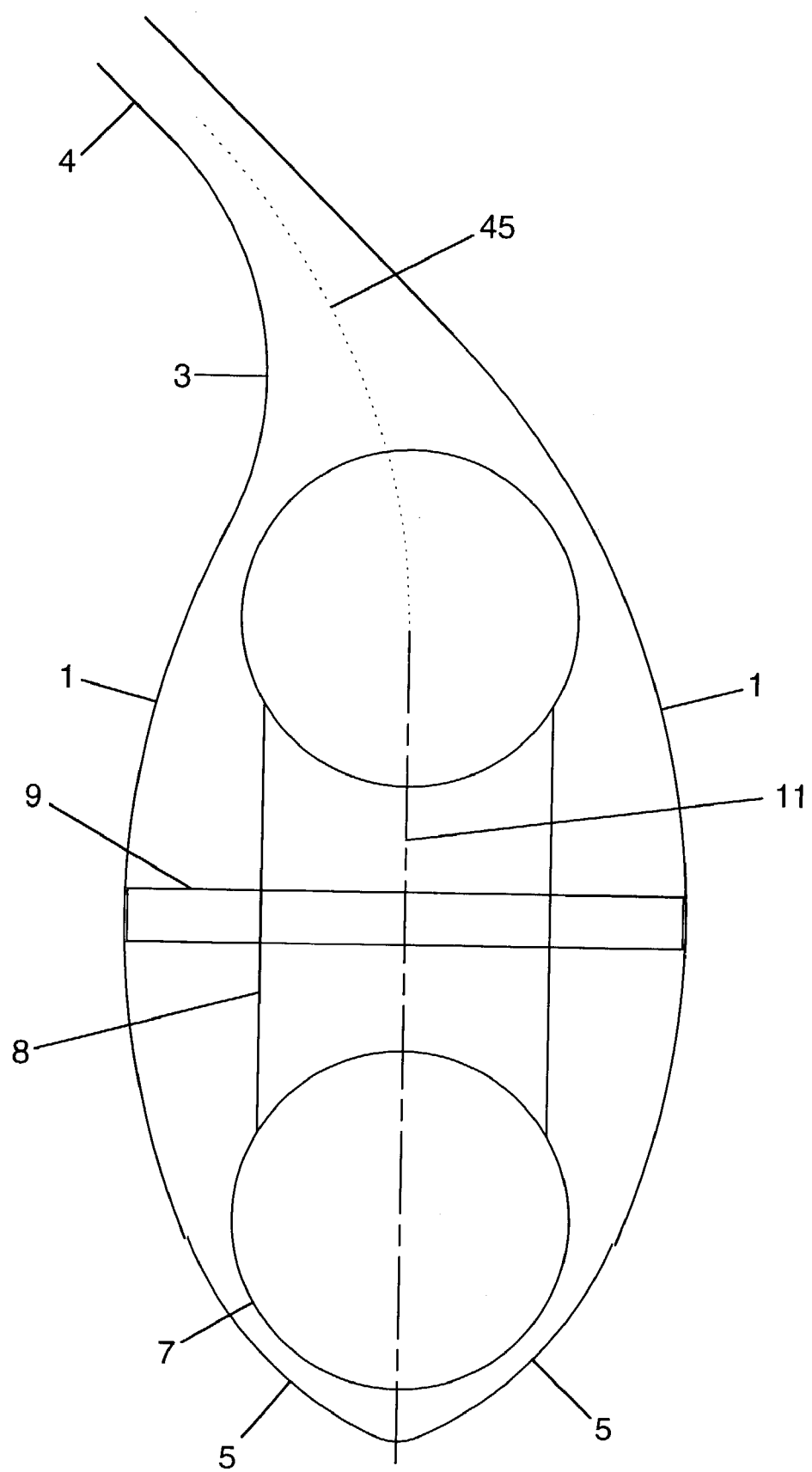
FIG. 7 is a section containing the axle of a wheel fairing seen from the front, showing a gear leg entering from above at a large angle away from the vertical. Note.

For planes where the existing structure requires the gear leg to emanate from the lower part of the fuselage, a third gear leg configuration is more desirable than those described above. In this configuration, the gear leg emanates from the fuselage aimed largely horizontal. As it approaches the wheel, it arcs smoothly downward and enters the wheel fairing near the top inboard "corner" of the wheel fairing. This is shown in FIG. 7. The fixed fairing (1), closed doors (5), tire (7), wheel (8), and axle (9) are the same as with a vertical gear leg (shown in FIG. 2). The intersection fairing (3) not only provides a smooth transition from wheel fairing (1) to gear leg (4), it also provides a transition from the vertical to an angle significantly away from the vertical.

One method of generating this bend in intersection fairing (3) is to draw a smooth transition from fixed wheel fairing (1) to gear leg (4) at the widest points of each. Then construct a median (45, shown dotted) that is the locus of points such that from each point on median (45) lines drawn perpendicular to each side of intersection fairing (3) are of equal length. Clearly, median (45) will extend from center line (11) of fixed fairing (1) to the central axis of gear leg (4). Following this procedure, a symmetrical air foil in intersection fairing (3) can be associated with each point of median (45). In the case shown in FIG. 7, the locus of points following the widest part of intersection fairing (3) follows a straight line on the outside of the bend, and is strongly curved on the inside of the bend. Still this procedure generates a symmetrical fairing at all locations.

This configuration effectively eliminates the intersection drag at the joint between the gear leg and the wheel fairing. Also it allows the wheel and axle to be mounted to a fork, with its inherent strength. It has no effect on the use of doors to cover the wheel assembly in flight.

For this configuration of gear leg, a properly designed wheel fairing will have a ridge on its upper side that connects the trailing edge of the wheel fairing thru the trailing edge of the intersection fairing to the trailing edge of the faired gear leg. For most of the length of the wheel fairing, this ridge will not be centered on the top of the wheel fairing but will follow a locus defined by having an optimum shape fairing at each height.

The invention claimed is:

1. An airplane wheel fairing for housing a tire mounted on a fixed gear leg attached to the airplane, the fairing comprising; a housing fixedly attached to the landing gear leg and having at least one movable door mounted on the housing, the housing sized so that a portion of the tire protrudes from the housing a fixed distance at all times, the at least one movable door configured to close so that the fairing completely encloses the tire and further configured to open into the housing clear of the tire to expose the portion of the tire that protrudes below the housing, the housing having a width less than the diameter of the tire, the moveable door providing an aerodynamic closure for the fairing.

2. The airplane wheel fairing as in claim 1 with exactly two movable doors.

3. The airplane wheel fairing as in claim 2 with exactly two movable doors wherein said movable doors rotate around axes approximately parallel to the longitudinal axis of the airplane.

4. The airplane wheel fairing as in claim 2 wherein said movable doors rotate around axes approximately parallel to the axle of the wheel.

5. The airplane wheel fairing as in claim 3 wherein said doors are symmetrical to each other.

6. The airplane wheel fairing as in claim 3 wherein said doors are not symmetrical to each other.

7. The airplane wheel fairing as in claim 3 wherein said movable doors rotate around axes that pass thru the wheel/tire/brake assembly.

8. The airplane wheel fairing as in claim 3 wherein said movable doors rotate around axes that extend outside the enclosure of said wheel fairing toward at least one end of said movable doors.

9. The airplane wheel fairing as in claim 3 wherein said movable doors rotate around axes that are not parallel to each other.

10. The airplane wheel fairing as in claim 3 wherein said movable doors rotate around axes that are not horizontal.

11. The airplane wheel fairing as in claim 3 wherein said movable doors rotate around axes that are neither parallel nor horizontal.

12. The airplane wheel fairing as in claim 3 wherein said movable doors rotate around axes spaced more widely at a rear end than they are at a front end.

13. The airplane wheel fairing as in claim 3 wherein said movable doors rotate around axes that are lower at a rear end than they are at a front end.

14. The airplane wheel fairing as in claim 3 wherein said movable doors rotate around axes that are both (A) spaced more widely at the rear than they are at the front and (B) lower at the rear than they are at the front.

15. The airplane wheel fairing of claim 1 having a ridge on a top side of said fairing for most or all of the length of said fairing aft of the gear leg.

16. The airplane wheel fairing as in claim 15 in which said gear leg enters said wheel fairing near said top side of said fairing.

17. The airplane wheel fairing as in claim 16 further comprising an intersection fairing near a joint between said gear leg and said wheel fairing.

18. The airplane wheel fairing as in claim 16 wherein said ridge forms a continuation of a trailing edge of said fairing of said gear leg and an intersection fairing to the trailing edge of said wheel fairing.

19. The airplane wheel fairing as in claim 1 in which the maximum length of the fairing is less than 3.8 times its maximum width.

* * * * *